United States Patent
Shin

[19]
[11] Patent Number: 5,999,600
[45] Date of Patent: Dec. 7, 1999

[54] FACSIMILE MAIL SYSTEM AND METHOD FOR CONTROLLING THE SAME

[75] Inventor: Dong-Myong Shin, Daegukwangyeok, Rep. of Korea

[73] Assignee: SamSung Electronics Co., Ltd., Kyungki-do, Rep. of Korea

[21] Appl. No.: 08/950,098

[22] Filed: Oct. 14, 1997

[30] Foreign Application Priority Data

Oct. 14, 1996 [KR]  Rep. of Korea ..................... 96-45736

[51] Int. Cl.$^6$ ............................. H04M 11/00; H04N 1/00
[52] U.S. Cl. ................................. 379/100.06; 379/93.27; 379/100.01; 358/434
[58] Field of Search .................................. 379/52, 88.16, 379/88.12, 88.24, 93.17–93.18, 93.24, 93.26–93.28, 93.02–93.03, 100.01, 100.06, 100.08–100.09; 358/403, 434, 435–439, 468; 340/825.34; 380/9, 18, 21

[56] References Cited

U.S. PATENT DOCUMENTS

| | | | |
|---|---|---|---|
| 4,426,555 | 1/1984 | Underkoffler | 379/93.18 |
| 4,427,848 | 1/1984 | Tsakanikas | 379/88.24 |
| 4,829,559 | 5/1989 | Izawa et al. | 379/93.18 |
| 4,918,721 | 4/1990 | Hashimoto | 379/93.18 |
| 5,022,072 | 6/1991 | Sakakibara et al. | 379/93.18 |
| 5,200,988 | 4/1993 | Riskin | 379/93.18 |
| 5,220,599 | 6/1993 | Sasano et al. | 379/88.12 |
| 5,241,595 | 8/1993 | Kuno | 379/100.17 |
| 5,307,178 | 4/1994 | Yoneda | 358/434 |
| 5,561,710 | 10/1996 | Helms | 379/93.27 |
| 5,583,933 | 12/1996 | Mark | 379/93.28 |
| 5,633,932 | 5/1997 | Davis et al. | 340/825.34 |
| 5,642,199 | 6/1997 | Ukai et al. | 358/434 |
| 5,739,918 | 4/1998 | Ouchi | 358/436 |
| 5,748,715 | 5/1998 | Shinagawa et al. | 379/93.18 |

FOREIGN PATENT DOCUMENTS

| | | |
|---|---|---|
| 5-308448 | 11/1993 | Japan . |
| 6-244997 | 9/1994 | Japan . |
| 7-66960 | 3/1995 | Japan . |
| 8-98005 | 4/1996 | Japan . |
| 2307140 | 5/1997 | United Kingdom . |
| 2309355 | 7/1997 | United Kingdom . |

*Primary Examiner*—Curtis A. Kuntz
*Assistant Examiner*—George Eng
*Attorney, Agent, or Firm*—Robert E. Bushnell, Esq.

[57] ABSTRACT

A facsimile mail system capable of receiving and printing out a literal message that a caller has left by using a telephone. The facsimile mail system forms a communication path upon detecting a ring signal and generates a first notification tone signal for notifying a start of a mail function to a calling party. Then, the system detects a DTMF signal generated from a telephone of the calling party and converts a literal message corresponding to the DTMF signal into an ASCII code which is to be stored into a memory. Further, the system compares a password received from the telephone of the calling party with a predetermined password, and prints out the stored literal message, if the received password coincides with the predetermined password.

6 Claims, 3 Drawing Sheets

| FIRST DIGIT \ SECOND DIGIT | 0 | 1 | 2 | 3 | 4 | 5 | 6 | 7 | 8 |
|---|---|---|---|---|---|---|---|---|---|
| 0 | SPACE | A | B | C | D | E | F | G | H |
| 1 | I | J | K | L | M | N | O | P | Q |
| 2 | R | S | T | U | V | W | X | Y | Z |
| 3 | + | − |   |   |   |   |   |   |   |
| 4 |   |   |   |   |   |   |   |   |   |
| 5 |   |   |   |   |   |   |   |   |   |
| 6 |   |   |   |   |   |   |   |   |   |
| 7 |   |   |   |   |   |   |   |   |   |
| 8 |   |   |   |   |   |   |   |   |   |
| 9 |   |   |   |   |   |   |   |   |   |
| * | PAUSE | | | | | | | | |
| # | END MARK | | | | | | | | |

FIG. 3

FACSIMILE MAIL SYSTEM AND METHOD FOR CONTROLLING THE SAME

CLAIM OF PRIORITY

This application makes reference to, incorporates the same herein, and claims all benefits accruing under 35 U.S.C §119 from an application entitled *Facsimile Mail System And Method For Controlling The Same* earlier filed in the Korean Industrial Property Office on Oct. 14, 1996, and there duly assigned Ser. No. 96-45736 by that Office.

BACKGROUND OF THE INVENTION

1. Field of the Invention

The present invention generally relates to an electronic mail system using a facsimile and a a method for controlling the same, and more particularly to a facsimile mail system for printing out a literal message that a user has left on the facsimile using numeric keys and a method for controlling the same.

2. Description of the Related Art

Presently, most homes utilize a touch-tone telephone capable of controlling communication equipment attached to the telephone by entry of one or more numerical keys of the touch-tone keypad. Additionally, the touch-tone keypad has been used for aiding the handicapped to communicate over the telephone system such as a telecommunication device for the deaf (TDD). In order for the deaf to utilize a telephone there are known systems which allows a caller to transmit an alphanumeric message by using the touch-tone keypad to transmit characters and a decoder at the receiving telephone decodes the dual tone multi-frequency signal (DTMF) transmitted by depressing the various keys of the touch-tone keypad and the message is then displayed so it can be read. Exemplars of such communication devices are found in U.S. Pat. No. 4,426,555 to Edwin C. Underkoffler entitled *Telephone Communications Device For Hearing-Impaired Person*; U.S. Pat. No. 4,427,848 to Peter J. Tsakanikas entitled *Telephonic Alphanumeric Data Transmission System*; U.S. Pat. No. 4,918,721 to Kazuo Hashimoto entitled *Push Button Phone Capable Of Sending To The Telephone Line Alphanumeric Characters*; U.S. Pat. No. 5,200,988 to Bernard N. Riskin entitled *Method And Means For Telecommunications By Deaf Persons Utilizing A Small Hand Held Communications Device*; and U.S. Pat. No. 5,561,710 to Ramon E. Helms entitled *Interactive Voice Communication Terminal With Alpha And Numeric Keypad.*

Additionally, many homes and businesses utilize a facsimile system to transmit and receive facsimile images. Generally, a facsimile prints out image information received from a calling facsimile, and sends image information of a document to a called facsimile. For example, in order to send the image information, a facsimile user should put a document on a document guiding plate and dial a telephone number of the called facsimile to form a communication path. Then, the image information is transferred to the called facsimile via the communication path and printed out on a paper sheet. Accordingly, it has become desirable to utilize these facsimile devices to receive a message from a person having no facsimile device. U.S. Pat. No. 4,829,559 to Shoji Izawa, et al. entitled *Facsimile Apparatus With A Mode For Receiving Non-Image Information* provides a facsimile terminal having a mode capable of receiving and printing out a message from a caller having no facsimile system as well as a general facsimile mode for receiving and printing transmitted images.

Further communications using the telephone line is in the form of electronic mail (e-mail) transmitted between users of personal computers. One problem that has arisen by the advent of e-mail is the reception of unwanted solicitations or messages (known as spam). Additionally, it well known that facsimile devices receive unsolicited messages/ advertisement which causes a waste in printer paper. Many jurisdictions have enacted laws to make such unsolicited communications unlawful, however, prosecution of such cases rests on the ability to prove who transmitted the message. To help in this regard it is required that a transmitting facsimile device transmit header information which is printed at the top of a document at a receiving facsimile device. Accordingly, I have determined that a facsimile device as described above will incur similar problems in that paper becomes wasted when anyone having a touch-tone telephone can transmit unwanted messages, and since there is no means provided in a touch-tone telephone for adding header information to the message generated by activation of the touch-tone keypad, controlling who can transmit a message to the facsimile device was not possible.

SUMMARY OF THE INVENTION

It is therefore an object of the present invention to provide a facsimile mail system capable of receiving and printing out a literal message from a caller using a touch-tone telephone.

It is another object to provide a facsimile mail system capable of restricting the printing of a literal message received from a caller using a touch-tone telephone by requiring a caller to enter a password before the message can be printed.

In order to achieve the above mentioned object, a facsimile mail system forms a communication path upon detecting a ring signal and generates a first notification tone signal for notifying a start of a mail function to a calling party. Then, the system detects a DTMF signal generated from a telephone of the calling party and converts a literal message corresponding to the DTMF signal into an ASCII code which is to be stored into a memory.

Further, the system compares a password received from the telephone of the calling party with a predetermined password, and prints out the stored literal message, if the received password coincides with the predetermined password.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

an FIG. 1 is a block diagram of a facsimile mail system according to an embodiment of the present invention;

FIG. 3 is a conversion table for converting a numeric key input into a literal message.

DETAILED DESCRIPTION OF THE PREFERRED EMBODIMENT

A facsimile mail system according to a preferred embodiment of the present invention will be described in detail hereinbelow with reference to the attached drawings.

Figure 1:
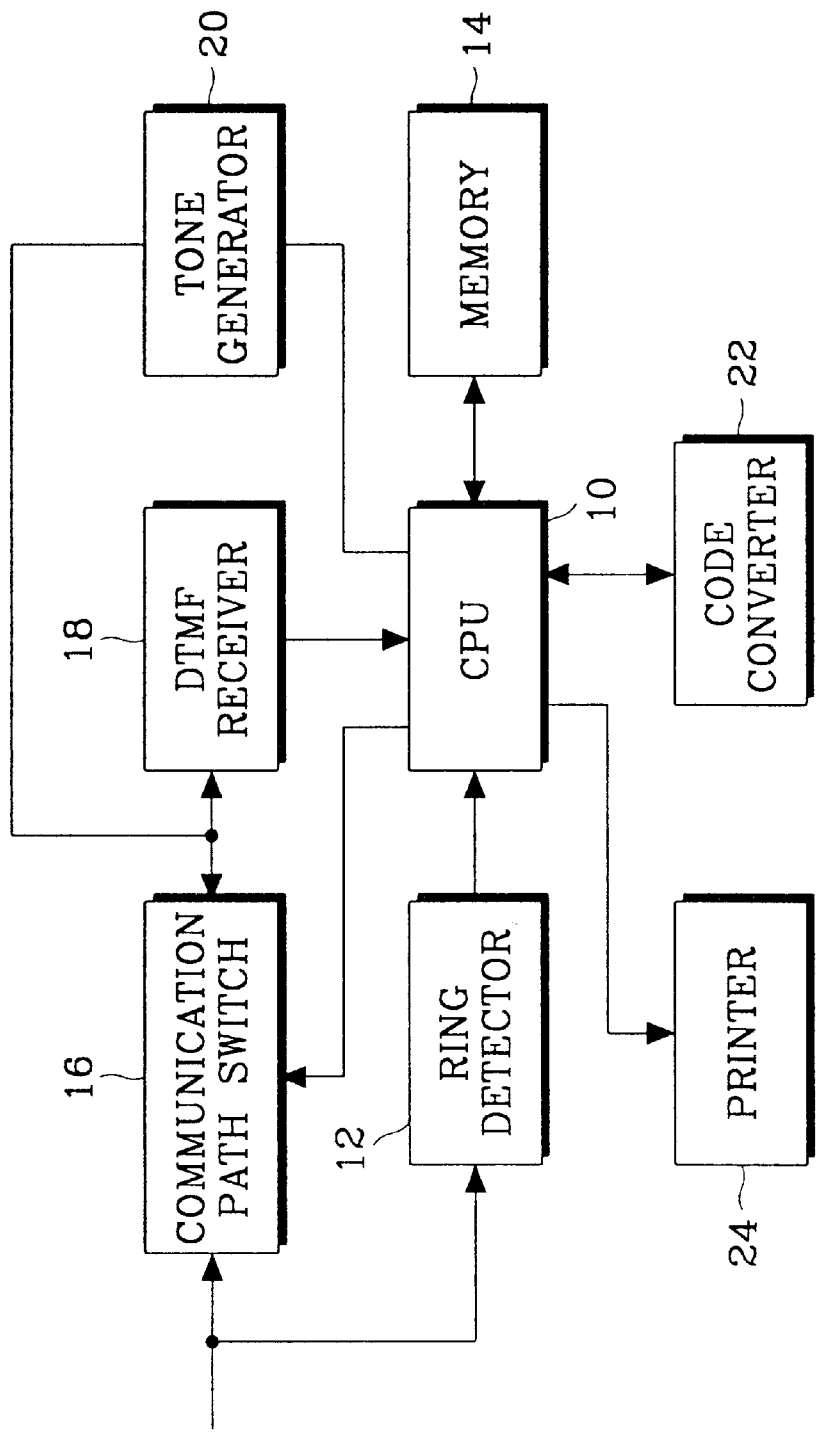

Referring to FIG. 1, a CPU (central processing unit) 10 controls an overall operation of the facsimile. For example, upon receiving a call, CPU 10 detects a DTMF (dual tone modulation frequency) signal received externally and converts a literal message into code data. Thereafter, CPU 10 stores the code data to print out the received literal message when a password is received. A ring detector 12 connected to a telephone line and CPU 10 detects a ring signal received through the telephone line and provides CPU 10 with the ring signal. A memory 14 stores a software program for a literal mail system according to the present invention and numeric key inputs received after reception of the ring signal under the control of CPU 10. A communication path switching circuit 16 forms a communication path to the telephone line under the control of CPU 10. A DTMF receiver 18 connected between communication path switching circuit 16 and CPU 10 converts the DTMF signal received from communication path switching circuit 16 into digital data and provides CPU 10 with the digital data. A tone generator 20 generates various tones according to the control of CPU 10. A code converter 22 converts the numeric key inputs into a literal code. A printer 24 prints out image data including the literal message on a recording paper under the control of CPU 10.

Figure 2:
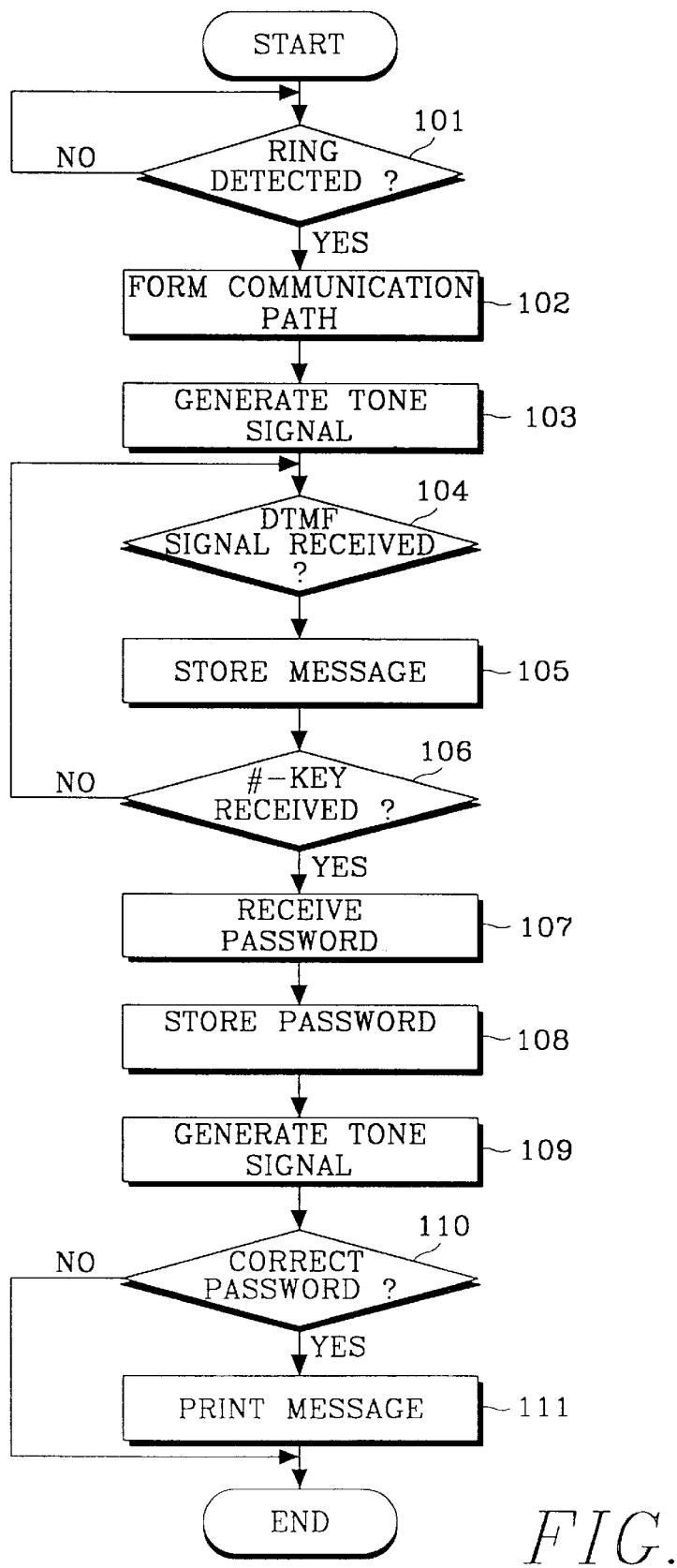
FIG. 2 is a flow chart for controlling a facsimile mail system according to an embodiment of the present invention.

Now, referring to FIGS. 1 through 3, operation of the facsimile mail system according to a preferred embodiment of the present invention will be described in detail.

CPU 10 checks, at a step 101, whether or not ring detector 12 has detected the ring signal given times. If the ring signal is detected, CPU 10 controls the communication path switching circuit 16 to form a communication path to the telephone line, at a step 102. At a step 103, CPU 10 controls tone generator 20 to generate a first notification tone signal through the telephone line, in order to notify the calling party that the literal mail function has begun. Then, upon hearing the tone signal, the caller recognizes that the literal mail function has begun and pushes the numeric keys corresponding to the literal message that the caller desires to leave. Then, the numeric key inputs are converted into the DTMF signal and transferred to the facsimile mail system of the invention through the public network. CPU 10 checks, at a step 104, whether or not DTMF receiver 18 has received the DTMF signal. If the DTMF signal has been received, CPU 10 controls code converter 22, at a step 105, to convert the numeric key input corresponding to the DTMF signal into an ASCII code based on the conversion table shown in FIG. 3, and stores the ASCII code into memory 14. In the meantime, upon completion of the numeric key input, the user (i.e., the caller) should push a #-key. Then, CPU 10 checks, at a step 106, whether or not DTMF receiver 18 has received the #-key. If the #-key is not received, the process returns to step 104 to repeatedly convert the successively received numeric key inputs. However, if the #-key is received, DTMF receiver 18 receives a password that the caller has sent using the dial keys, and provides CPU 10 with the password, at a step 107. Thereafter, at a step 108, CPU 10 stores the 4-digit password into memory 14. At a step 109, CPU 10 controls tone generator 20 to generate a second notification tone signal through the telephone line for notifying the caller that the mail function is completed. Then, CPU 10 compares the currently received password with a password stored in memory 14, at a step 110, to check whether or not the passwords are coincident with each other. As a result of the comparison, if the passwords are not coincident with each other, CPU 10 completes the program. However, if the passwords are coincident with each other, CPU 10 controls printer 22 to print out the literal message that the caller has stored into memory 14, at a step 111. Then, CPU 10 completes the program.

Although the present invention converts the numeric key input into alphabetic information, for reference, based on a conversion table of FIG. 3, it should be clearly understood that the same is available for other literal information such as Korean and Japanese instead of the alphabetic information.

As described in the foregoing, in accordance with the present invention, a caller calls a facsimile of the invention by using a telephone and leaves a literal message by pushing the dial keys. Then, the DTMF signal corresponding to the numeric key input is transferred to the facsimile mail system of the invention, and converted into a literal code (e.g., ASCII code) based on the conversion table. The literal code is printed out by the printer prepared in the facsimile mail system. In this way, the facsimile mail system of the invention can receive and print out a literal message that the caller has left using a telephone.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A facsimile mail system comprising:
   a controller for controlling the facsimile mail system overall;
   a ring detector connected to a telephone line and said controller, for detecting a ring signal received through the telephone line to provide said controller with the ring signal received;
   a memory for storing a plurality of passwords, a software program and a numeric key input received after reception of said ring signal according to a control of said controller;
   a communication path switching circuit for forming a communication path according to a control of said controller;
   a tone generator for generating a first tone signal according to a control of the controller for informing a caller to start a mail function by sequentially inputting, for transmission over said communication path, a message, an end of message signal and a password as dual-tone modulated-frequency (DTMF) signals using a DTMF keypad;
   a DTMF receiver, connected between said communication path switching circuit and said controller, for converting said DTMF signals from said communication path switching circuit into digital data and a received password and providing said controller with the digital data and said received password;
   a code converter for converting said digital data input into a literal code according to a control of said controller;
   said memory storing said received password and the literal code according to a control of said controller;
   said tone generator generating a second tone signal according to a control of the controller for informing the caller of an end of said mail function after storing said received password in said memory;
   said controller comparing said received password with said plurality of passwords stored in said memory; and
   a printer for printing the literal code on a recording paper according to a control of said controller when said controller determines that said received password coincides with one of said stored passwords.

2. A method for controlling a facsimile mail system, comprising the steps of:

forming a communication path upon detecting a ring signal and generating a first notification tone signal for notifying a start of a mail function to a calling party;

detecting a DTMF signal generated from a telephone of said calling party; and converting said DTMF signal into an ASCII code and storing said ASCII code as a literal message;

detecting an end-of-message signal transmitted from said calling party, said end-of-message signal being generated by said calling party activating a # key, said caller transmitting a password after activating said # key;

receiving said password from said calling party;

comparing said password to a plurality of stored passwords; and printing said literal message when said password coincides with one of said plurality of stored passwords.

3. The method as set forth in claim 2, further comprising a step of generating a second notification tone signal and providing said second notification tone signal to said calling party to notifying said calling party of an end of said mail function.

4. A method for controlling a facsimile mail system, comprising the steps of:

forming a communication path upon detecting a ring signal and generating a first notification tone signal for notifying a start of a mail function to a calling party;

detecting a DTMF signal generated from a telephone of said calling party; and converting said DTMF signal into an ASCII code and storing said ASCII code as a literal message;

detecting an end-of-message signal transmitted from said calling party, said calling party a transmitting a password after transmitting said end-of-message signal;

receiving said password from said calling party;

storing said received password;

generating a second notification tone signal after storing said received password, and providing said second notification tone signal to said calling party to notifying said calling party of an end of said mail function;

comparing said password to a plurality of stored passwords; and printing said literal message when said password coincides with one of said plurality of stored passwords.

5. The method as set forth in claim 4, wherein said step of detecting an end-of-message signal transmitted from said calling party comprises detecting a signal generated by said calling party activating a # key.

6. A method for controlling a facsimile mail system, comprising the sequential steps of:

forming a communication path upon detecting a ring signal and generating a first notification tone signal for notifying a start of a mail function to a calling party;

detecting a DTMF signal generated from a telephone of said calling party; and converting said DTMF signal into an ASCII code and storing said ASCII code as a literal message;

detecting an end-of-message signal transmitted from said calling party, said end-of-message signal being generated by said calling party activating a # key, said caller transmitting a password after activating said # key;

receiving said password from said calling party;

storing said received password in a memory;

generating a second notification tone signal after storing said received password, and providing said second notification tone signal to said calling party to notifying said calling party of an end of said mail function;

comparing said stored password to a plurality of passwords stored in said memory; and printing said literal message when said password coincides with one of said plurality of stored passwords.

* * * * *